July 18, 1950 H. G. HAYES 2,515,345
PORTABLE POWER OPERATED SPLITTING BAND SAW
Filed March 22, 1948 2 Sheets-Sheet 1

H. G. Hayes
INVENTOR

BY *Snow & Co.*
ATTORNEYS.

July 18, 1950           H. G. HAYES           2,515,345
PORTABLE POWER OPERATED SPLITTING BAND SAW
Filed March 22, 1948           2 Sheets-Sheet 2
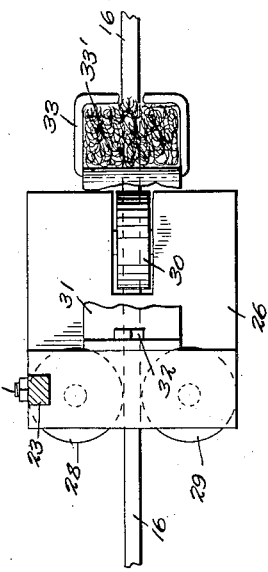
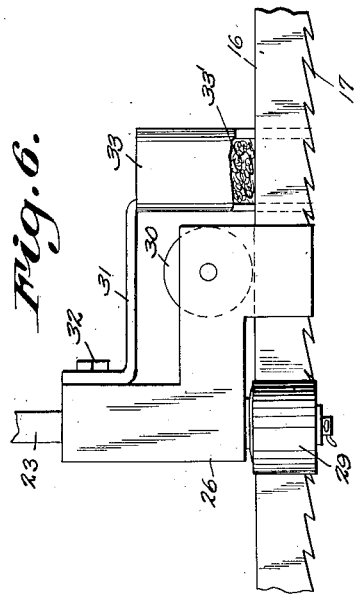
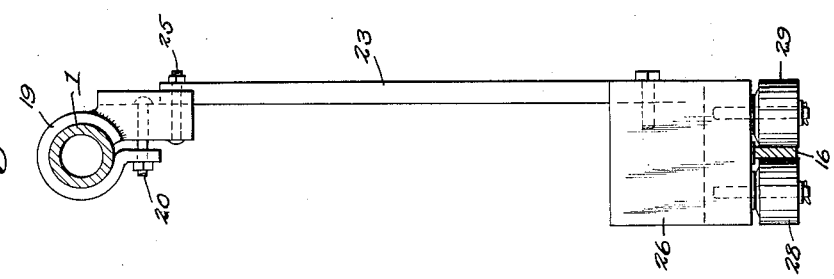
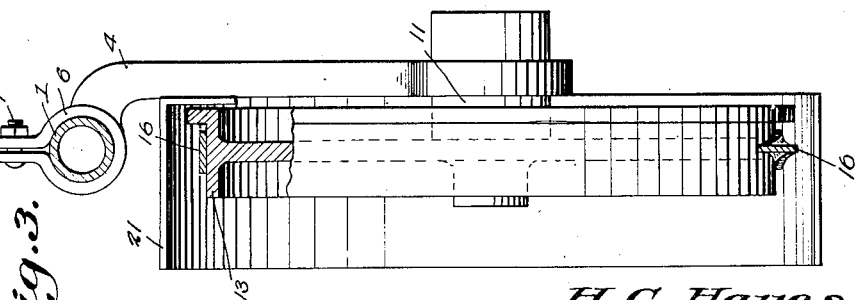
H. G. Hayes
INVENTOR
BY *C. A. Snow & Co.*
ATTORNEYS.

Patented July 18, 1950

2,515,345

UNITED STATES PATENT OFFICE 2,515,345

PORTABLE POWER-OPERATED SPLITTING BAND SAW

Henry G. Hayes, Leonardville, Kans.

Application March 22, 1948, Serial No. 16,294

1 Claim. (Cl. 143—19)

This invention relates to improvements in portable power operated splitting band saws.

An object of the invention is to provide an improved portable power operated carcass splitting band saw adapted for use by butchers in splitting the carcass of an animal which has been slaughtered.

Another object of the invention is to provide an improved manually supported power operated carcass splitting band saw which will be preferably driven by a suitable electric motor whose shaft is connected to the band saw drive wheel by means of a suitable flexible shaft.

A further object of the invention is to provide an improved portable manually supported power driven band saw for use by butchers in splitting carcasses, the same being provided with a J-shape main supporting frame, a pair of band saw supporting wheels adjustably supported thereon, a pair of saw blade turning and aligning blocks adjustably supported on the frame, and means for driving the band saw at a high rate of speed.

A still further object of the invention is to provide an improved portable power operated carcass splitting band saw which will be highly efficient in use and relatively inexpensive to manufacture and produce.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings

Figure 3 is a sectional view taken on the line 3—3 of Figure 1.

Figure 4 is a sectional view taken on the line 4—4 of Figure 1.

Figure 5 is a sectional view taken on the line 5—5 of Figure 1.

Figure 6 is a detail side elevation of a band saw blade turning and aligning block and saw blade lubricating device.

Like characters of reference are used throughout the following specification and the accompanying drawings to designate corresponding parts.

Figure 1:
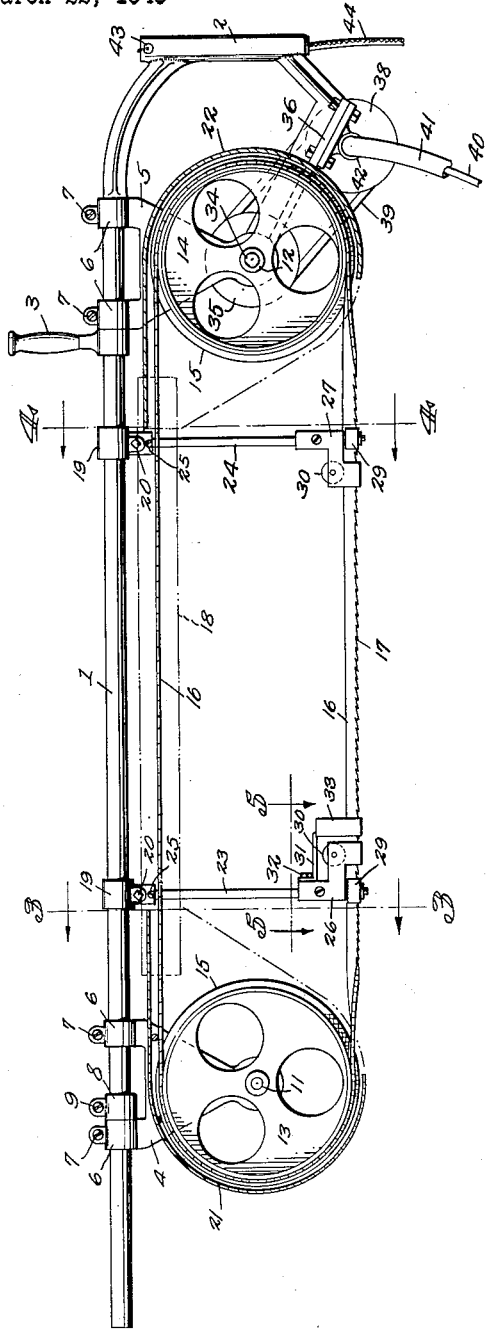
Figure 1 is a side elevation of the improved portable power operated carcass splitting band saw.
Figure 2:
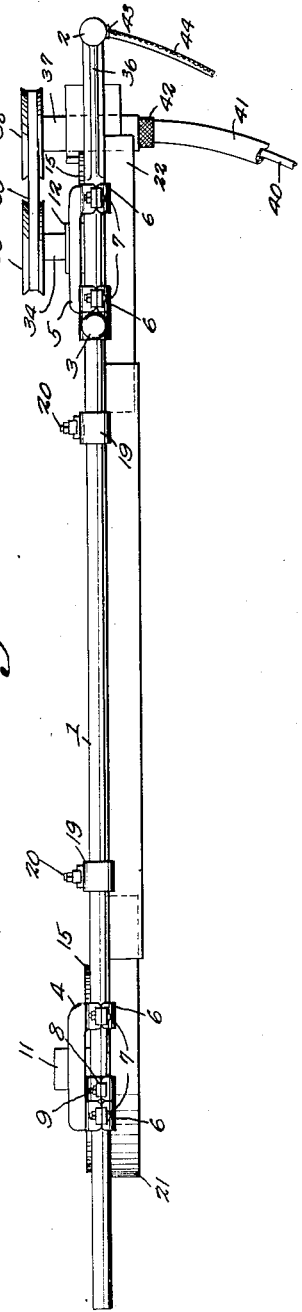
Figure 2 is a plan view of the improved portable power operated carcass splitting band saw.

In carrying out the invention, there is shown and provided an improved manually supported portable power operated carcass splitting band saw including a tubular J-shape main supporting frame 1 which is formed with an integral handle 2 being a part of the hook portion of the frame 1, and extending at approximately right angles to the straight portion of the frame 1. An upwardly extending handle 3 is adjustably secured to and supported upon the straight portion of the frame 1 adjacent its hooked end, whereby the handles 2 and 3 may be readily grasped by a butcher while supporting and operating the carcass splitting band saw.

Offset depending substantially V-shape or triangular carriages 4 and 5 are adjustably supported upon the straight portion of the tubular main frame 1 by means of the spaced upwardly extending strap clamps 6 and bolts 7, whereby the carriages may be shifted along the main frame 1 if and when desired. An additional locking strap clamp 8 with bolt 9 will be secured about the main frame 1 between the strap clamps 6 on the outer carriage 4 for locking the same firmly in adjusted position.

Laterally extending axles or hubs 11 and 12 will be supported by the lower ends of the carriages 4 and 5, and will rotatably support the wheels 13 and 14 which are formed with upwardly or outwardly extending peripheral flanges 15.

A continuous band saw blade 16 having teeth 17 on one edge only will be disposed about and between the rotatable supporting flanged wheels 13 and 14.

A longitudinally extending rigid bar 18 will be formed at its opposite ends with the upwardly extending strap clamps 19 and securing bolts 20 for attachment about the main frame 1 between the carriages 4 and 5, and will support the depending arcuate guard plates 21 and 22 which extend in spaced relation about the outer exposed ends of the band saw blade supporting wheels 13 and 14.

Depending rods or arms 23 and 24 are supported by the bar 18 by means of the bolts 25, and detachably support upon their lower ends Z-shape saw blade turning and aligning blocks 26 and 27, which in turn support the spaced depending saw blade guiding and turning rollers 28 and 29 between which the saw blade 16 passes, and the saw blade edge contacting and guiding rollers 30 for turning the horizontally disposed saw blade 16 to vertical cutting position when between the blocks 26 and 27.

Bracket 31 is secured by the bolts 32 to the block 26, and supports the slotted saw blade lubricating house 33 in which suitable lubricated packing 33' is received, and is adapted to contact the saw blade 16 as it operates.

A stub shaft 34 is supported by the hub 12 and supports the saw blade supporting wheel 14 at one end of a pulley 35 at its opposite end.

A reinforcing arm 36 is connected between the carriage 5 and the end of the curved portion of the main frame 1, and supports a bracket bearing 37 in which a stub shaft (not shown) is rotatably mounted. A pulley wheel 38 is mounted upon the stub shaft and is connected with the pulley 35 by means of a belt 39.

A flexible shaft 40 with surrounding guard housing 41 is secured by the ferrule 42 to connect with the stub shaft (not shown), and the flexible shaft 40 will lead to and be driven by a suitable electric motor (not shown). A switch 43 will be supported upon the handle 2 and will be connected with the electric conductor 44 to control the operation of the electric motor (not shown).

While the preferred embodiment of the instant invention has been illustrated and described, it will be understood that it is not intended to limit the scope of the invention thereto, as many minor changes in detail of construction may be resorted to without departure from the spirit of the invention.

What is claimed is:

A portable power-operated splitting band saw comprising a supporting frame formed from a single length of tubular stock bent into a J shape, said frame including an elongated straight portion constituting a stringer for portions of the saw to be supported by the frame, said frame including a depending extension integral with one end of said straight portion and constituting a handle; a drive pulley on said handle; means for driving said pulley; an endless belt passing around said drive pulley; a wheel carriage depending from said straight portion and including ring clamps surrounding said straight portion and adjustable longitudinally of said straight portion for selected positioning of said wheel carriage relative to the drive pulley; a wheel mounted for rotation upon said wheel carriage; a driven pulley rotatable with said wheel and around which said belt passes, the tension of said belt being adjusted by selected positioning of the wheel carriage relative to the handle; a guard member including a pair of ring clamps surrounding said straight portion and adjustable longitudinally of said straight portion for selected positioning of the guard member upon the straight portion, said guard member including a connecting bar depending from the ring clamps and wheel coverings depending from opposite ends of said connecting bar, one of said coverings extending over said wheel; blade turning and guiding means depending from said connecting bar; a blade passed around said wheel and extending longitudinally of the straight portion, said blade turning and guide means engaging said blade adjacent opposite ends of said guard member; and a second wheel carriage including a pair of ring clamps surrounding and adjustable longitudinally of said straight portion, said second wheel carriage including a driven wheel around which said blade passes.

HENRY G. HAYES.

REFERENCES CITED

The following references are of record in the file of this patent:

UNITED STATES PATENTS

| Number | Name | Date |
|---|---|---|
| 495,830 | Pake | Apr. 18, 1893 |
| 1,448,188 | Brooke | Mar. 13, 1923 |
| 1,449,805 | Arnold et al. | Mar. 27, 1923 |
| 1,453,335 | Bennett | May 1, 1923 |
| 1,466,090 | DeCew et al. | Aug. 28, 1923 |
| 1,512,425 | Klopfenstein | Oct. 21, 1924 |
| 1,700,275 | Willett | Jan. 29, 1929 |
| 1,721,722 | Wells | July 23, 1929 |